United States Patent
Grile

(10) Patent No.: US 7,448,839 B2
(45) Date of Patent: Nov. 11, 2008

(54) VEHICULAR TOWING APPARATUS USING AIR LIFT

(76) Inventor: Merrill L. Grile, 1128 River Ave. S., Sauk Rapids, MN (US) 56379

( * ) Notice: Subject to any disclaimer, the term of this patent is extended or adjusted under 35 U.S.C. 154(b) by 642 days.

(21) Appl. No.: 10/778,759

(22) Filed: Feb. 14, 2004

(65) Prior Publication Data

US 2004/0161323 A1    Aug. 19, 2004

Related U.S. Application Data

(63) Continuation of application No. 09/767,598, filed on Jan. 22, 2001, now Pat. No. 6,692,218.

(60) Provisional application No. 60/176,907, filed on Jan. 20, 2000.

(51) Int. Cl.
*B65G 1/00* (2006.01)
(52) U.S. Cl. ...................................... 414/563
(58) Field of Classification Search ................. 414/563, 414/482, 426, 558
See application file for complete search history.

(56) References Cited

U.S. PATENT DOCUMENTS

| | | | | |
|---|---|---|---|---|
| 4,264,262 A | * | 4/1981 | LoCodo | 414/563 |
| 4,679,978 A | * | 7/1987 | Holmes et al. | 414/563 |
| 5,785,341 A | * | 7/1998 | Fenton | 280/441 |
| 5,984,616 A | * | 11/1999 | Youmans et al. | 414/563 |

* cited by examiner

*Primary Examiner*—Charles A Fox
(74) *Attorney, Agent, or Firm*—Albert W. Watkins

(57) ABSTRACT

A vehicular towing apparatus incorporates an air bag in association with shock absorbers and a tow bar. The air bag may be selectively inflated and deflated, allowing the tow bar to be raised and lowered at will. In addition, the tow bar may be extended or retracted as desired. Several platform attachments enable the towing apparatus to be used alternatively as an automobile tow bar, a support for motorcycles or bicycles, or other items that may be supported upon a platform. The towing apparatus retracts under the vehicle, and may also serve as a vehicle step or standard trailer ball attachment point.

2 Claims, 2 Drawing Sheets

VEHICULAR TOWING APPARATUS USING AIR LIFT

CROSS REFERENCE TO RELATED APPLICATIONS

This application claims priority to U.S. Provisional Application serial No. 60/176,907 filed Jan. 20, 2000, the contents which are incorporated herein by reference in entirety, and is a continuation application of allowed U.S. utility application Ser. No. 09/767,598 filed on Jan. 22, 2001 copending herewith and scheduled to be granted as U.S. Pat. No. 6,692,218, on Feb. 17, 2004, the contents which are incorporated herein by reference in entirety.

BACKGROUND OF THE INVENTION

1. Field of the Invention

The present invention pertains to land vehicles generally, and more specifically to an apparatus used to interconnect a towing and transporting vehicle to a transported load. In one embodiment, the transported load is a second land vehicle, and may include such diverse vehicles as automobiles, utility trucks, motorcycles, trailers and other vehicles and non-vehicles. In a more specific embodiment, the invention pertains to a multi-purpose apparatus which enables an automobile or utility vehicle to conveniently be towed behind a mobile home, recreational vehicle, camper or the like.

2. Description of the Related Art

When a first vehicle is used to tow a second, a variety of schemes have been proposed to enable satisfactory towing. In one approach, the second vehicle is connected to the first through a flaccid connector such as a cord, cable, chain or strap. The flaccid connector will be rated to withstand the forces required to accelerate the towed vehicle, and may also provide some degree of resilience to reduce these forces and spread them over a greater time interval. While this approach may seem to be the simplest, and certainly requires a minimum of special equipment, the flaccid connector does not maintain spacing between the two vehicles. Consequently, when the towing vehicle decelerates, the towed vehicle must somehow be controlled to also brake or slow down. Most frequently, a second driver occupies the towed vehicle, and applies brakes as required. In the event the second driver briefly loses attention at the same time that the front vehicle slows down, a serious accident may result. In fact, history has demonstrated repeatedly that the second driver is unduly endangered.

A second limitation arises from the design of modern automatic transmissions. Most modern vehicles are equipped with automatic transmissions that cannot be operated under external power. In other words, if the trailing vehicle has a modern automatic transmission, simply shifting the transmission into neutral is not sufficient. Towing the vehicle, even in neutral, may seriously damage the transmission. This is particularly true at highway speeds or if long distances are to be traversed. Consequently, either the transmission must be disconnected from the wheels, or the drive wheels must somehow be lifted from the ground. Disconnecting the transmission is not a task which would be attempted by most persons, and there is no equipment provided in the flaccid connector approach for lifting vehicle drive wheels. Consequently, this technique of using a long flaccid connector between vehicles is normally reserved for situations where one vehicle must only be towed a very short distance, such as from a ditch or hazard back onto the roadway, or for short, low-speed transit such as might occur over a short distance on city streets.

In a second approach to towing, a rigid connector is provided between the vehicles. This may take the form of special linkage that attaches to a ball or other point on the front vehicle, and to the frame, bumper or the like of the trailing vehicle. A ball somewhere within the draft connection is required, since the two vehicles will not always maintain the same planar relationship. For example, when passing through a pot hole or dip in one side of the road, the leading vehicle will tilt from horizontal. However, the second vehicle will not yet be to the dip, and so will still be horizontal. Without the ball or some other articulating connection, undue stresses will be placed upon the vehicles and the draft connection. Balls and mating sockets are preferred for eliminating this undesired stress, owing to their relatively simple construction and the ability for the draft connection to be moved through three dimensions. In other words, through a ball connection the trailing vehicle may move relative to the towing vehicle left and right, up and down, or roll about a longitudinal axis. Consequently, the number of components, complexity and resultant cost are greatly reduced by using a ball connection.

In spite of the many advantages of balls, which are very commonly used in trailers and in some vehicle to vehicle draft connections, the risk of damaging a modern vehicle with an automatic transmission by towing still remains. Several additional approaches have been taken commonly, each which prevent damage to the transmission or drive train of the towed vehicle. In the first approach, the towed vehicle is simply carried upon a larger transport, such as a large flat-bed truck or vehicle transport truck. While this approach works for special purposes such as delivery of new cars or the transport of racing vehicles, it does require that the towing and transport vehicle be very large and have sufficient space for a second vehicle. This limits the use of the towing and transport vehicle to only a few specialized needs, and requires a substantial financial investment in the towing vehicle and storage space when not in use.

In a different approach, the towing vehicle will use a cable or similar flaccid connector to not only engage the towed vehicle, but to lift it off of the ground. This technique is used universally by nearly all commercial tow trucks. Unfortunately, while this technique offers great flexibility in towing very diverse vehicles, a dedicated vehicle with a large boom and winch system is also required. Once again then, a substantial financial investment must be made, and special storage provided for when this special purpose vehicle is not in use.

Another approach incorporates a set of wheels in a small trailer. The towed vehicle drive wheels are driven or placed onto a set of supports between the trailer wheels. The trailer is then connected to the towing vehicle through a ball, allowing multiple axis movement or articulation between towing and towed vehicles. Unfortunately, there are still several drawbacks which arise. First of all, the trailer again requires extra equipment, and also storage space when not in use. A second drawback stems from the extra width required within the small trailer. It must not only be the width of the towed vehicle, but must also have a set of wheels even wider. This extra width is generally undesirable, and, where the towed vehicle is already approaching the legal limits for width, this will lead to an oversize restriction. Further, the set of wheels on the small trailer require maintenance, over and above the maintenance already required by the separate vehicle wheels.

A third drawback is actually characteristic of all ball and hitch connections. When a towed vehicle articulates with respect to the towing vehicle, which may be induced for example by unevenness in the road surface, there is nothing provided to absorb the changes in direction between the towing and towed vehicles. For example, when a towing vehicle travels across a parking lot that slopes downward towards a roadway, both towing vehicle and trailer are in-line and co-axial. However, as the vehicle enters the roadway, the vehicle will change to horizontal. The trailer still points downward. At this moment, the momentum of the trailer would continue the trailer tongue in a direction down into the roadway pavement. Therefore, the towing vehicle ball must not only pull the trailer, but must also lift the trailer tongue. This lifting force results in a shift in the balance of the towing vehicle, effectively reducing the weight of the towing vehicle front wheels. If the transition from parking lot to roadway is sufficiently severe, and the towing vehicle and trailer are close in weight or the towing vehicle has a longer distance between the rear wheels and the hitch, this can actually lead to dangerous lifting of the towing vehicle front wheels or loss of traction. Furthermore, the additional shifting of the towing vehicle reduces the comfort of the ride by transmitting these forces from the hitch into the vehicle cabin. This also places undue stress upon the vehicles and components, requiring a substantial under-rating of the components, so that they can withstand these momentary stresses.

In the prior art, there have been several attempts made at overcoming the limitations of the popular draft connections. U.S. Pat. Nos. 2,452,710 to Allen; U.S. Pat. No. 2,463,140 to Bihn; U.S. Pat. No. 2,966,369 to Paul, Jr.; U.S. Pat. No. 3,223,435 to Yarbrough; U.S. Pat. No. 3,235,286 to Meadowcroft; U.S. Pat. No. 3,239,242 to Adams; U.S. Pat. No. 3,241,862 to Bunting; U.S. Pat. No. 3,250,548 to Boyd; U.S. Pat. No. 3,284,098 to Worley; U.S. Pat. No. 3,311,389 to Barton et al; U.S. Pat. No. 3,680,892 to Olthoff et al; U.S. Pat. No. 3,961,813 to Thomas; U.S. Pat. No. 4,304,419 to Richardson; U.S. Pat. No. 4,351,542 to Lovell et al; and U.S. Pat. No. 4,512,593 to Ehrhardt are each exemplary, and incorporated herein by reference for their teachings. These illustrate a variiety of resilient couplings between two vehicles. Nevertheless, each of these connections only serve as a shock absorber or adjunct to a standard type of hitch, and do not expand or enhance the application of the connection equipment, nor do they fully address the objectives of the present invention.

What is desired then is an articulating connection which allows many diverse loads and vehicles to be towed and transported, without unnecessarily reducing the safety or comfort of the towing vehicle, and not requiring additional passengers or operators other than the single driver of the towing vehicle.

SUMMARY OF THE INVENTION

Exemplary embodiments and manifestations of the present invention solve the inadequacies of prior towing apparatus by providing an air bag in association with shock absorbers and a tow bar, which provides unprecedented cushion and following for towed vehicles. The air bag is most preferably a high capacity bag which may be selectively inflated and deflated, thereby allowing the tow connection to be raised and lowered at will. In addition, the tow bar may be extended or retracted as desired. Several platform attachments enable the towing apparatus to be used alternatively as an automobile tow bar, a support for motorcycles or bicycles, or other items that may be supported upon a platform. When not in use, the towing apparatus stows under the vehicle out of the way. The towing apparatus may also serve as a vehicle step or standard trailer ball attachment point.

In a first manifestation, the invention is an articulated vehicle having a front section with a source of motive power therein, a rear section, and a flexible joint between the front and rear sections. A framework is pivotal about a first axis and extends to the flexible joint. A suspension assembly provides variable forces between the front section and framework, and includes an air bag, and a means for operatively adjusting pressure within the air bag. The pressure changes cause the framework to pivot about the first axis and thereby raise and lower the flexible joint during use.

In a second manifestation, the invention is an apparatus for supporting a trailing load upon a towing means during transit. A framework attaches to the towing means. A shaft pivots about a transverse axis, and a variable pressure air bag rotates the shaft about the transverse axis, while simultaneously reducing a peak amplitude of acceleration forces about the transverse axis generated between towing means and trailing load during travel.

In a third manifestation, the invention is a vehicular towing apparatus. An extensible shaft pivots about an axis and may be extended radially therefrom by a variable amount. A motor is provided for extending or retracting the extensible shaft. A gas container varies in size responsive to internal inflation pressure and external forces applied thereto, and is coupled to the extensible shaft. A source of pressurized gas is provided in association with a means for controlling a pressure within said gas container, so that the pressure control means may be used to selectively apply pressurized gas to the gas container or release pressurized gas from the gas container, to thereby pivot the extensible shaft about the axis. A means is also provided for coupling the extensible shaft to a second vehicle.

OBJECTS OF THE INVENTION

A first object of the present invention is to enable the towing and transport of diverse loads without requiring vehicles limited solely to the purpose of towing. A second object of the invention is to enable existing vehicles to be readily retrofit while maintaining the basic construction and configuration of essential components. A third object of the invention is to provide an apparatus for towing a land vehicle which serves to mechanically isolate the towing vehicle from the towed vehicle, thereby improving safety, ride and handling. A further object of the invention is to enable the towing apparatus to be stored when not in use without requiring separate storage facility or space, and for the towing apparatus to provide added benefit and utility to the towing vehicle when not in use as a towing apparatus. Yet another object of the present invention is for the apparatus to improve the tracking of a towed vehicle and to thereby reduce the skill needed to operate the towing vehicle and increase the safety of the towing process.

BRIEF DESCRIPTION OF THE DRAWINGS

Other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
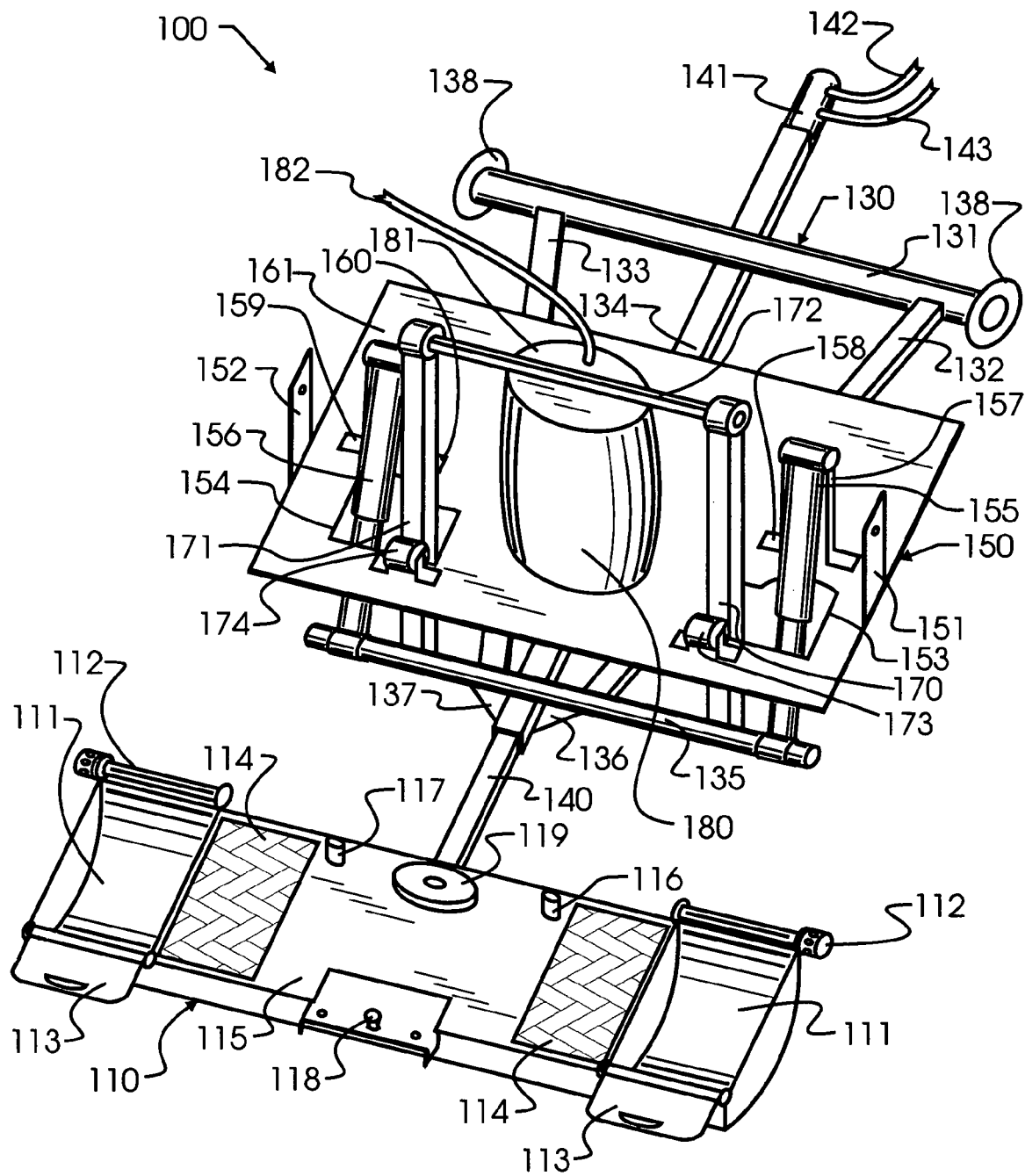
FIG. 1 illustrates the primary structural assembly of the preferred embodiment vehicular towing apparatus from a projected plan view, prior to attachment to a towing vehicle.

Primary structural assembly 100 of preferred embodiment vehicular towing apparatus 200 includes a towing and transporting platform 110, a framework 130, and a suspension assembly 150. Towing and transporting platform 110 is provided with small ramps 113 and wheel receiving cusps 111 which will serve to support the front wheels 222 of vehicle 220. As can be best seen from FIG. 2, a strap 120 may be provided to securely attach tire 222 to wheel cusp 111 during transport. In the preferred embodiment, a ratchet 112 is provided to tighten strap 120, as is known in the general hardware field of tie-down devices. Alternative methods of attachment between vehicle 220 and platform 110 are contemplated, and will be obvious to those skilled in the art. For example, while a flaccid strap is most preferred, a chain-type fastener and chain may also be used. Furthermore, other vehicles besides passenger cars and utility vehicles may be transported. In such instances, different geometries of platforms may be designed and used in accord with the present invention to enable the towing and transport of a wider range of vehicles and things. For example, a motorcycle platform may be provided which would enable the motorcycle to be carried entirely upon platform 110 in a direction transverse to towing vehicle 210.

Platform 110 may preferably, but optionally, be provided with additional features including non-slip tread plate 114, which allows a person to step onto platform 110 safely. A standard ball 118 may additionally be provided, with the three-hole arrangement if desired, and small stops 116 and 117 may be added. A vertical pivot 119 will most preferably include a bushing or bearing which allows rotation about a generally vertical axis. This allows platform 110 to pivot relative to extensible shaft 140, as will be further described hereinbelow. Platform 110 may optionally be slightly elevated at central region 115 to better accommodate the movement of platform 110 with respect to shaft 140.

Extensible shaft 140 connects platform 110 to framework 130. Framework 130 is pivotal about an axis parallel to the longitudinal direction of axle tube 131. Axle tube 131 terminates in mounting plates 138. The specific use of axle tube 131 and mounting plates 138 is not critical to the invention, other than the provision of a sturdy and pivotal support for the remainder of framework 130 and structural assembly 100. Structural tubes 132, 133 form a structural A-frame extending from axle tube 131 to suspension tube 135. Between tubes 132, 133 is outer casing 134, which is most preferably rigidly attached to both axle tube 131 and suspension tube 135. Extra structural plates 136, 137 may be provided specifically for this purpose. While plates 136, 137 are illustrated only at the junction between casing 134 and suspension tube 135, those skilled in the art will recognize that these plates 136, 137 may be omitted entirely, provided other adequate reinforcing or structurally sound methods of attachment are used, or may alternatively be provided at more junctions for structural support, such as between tubes 132, 133 and axle tube 131 or suspension tube 135.

At an end of casing 134 distal to platform 110, hydraulic motor 141 will preferably be mounted and connected to hydraulic lines 142, 143. Motor 141 is used to turn a screw or other mechanism traveling inside of casing 134, which extends or retracts extensible shaft 140 therein. In a simple manifestation, motor 141 will turn a screw shaft, and shaft 140 will be provided with a threaded nut which slides along the screw shaft. However, there are a variety of mechanical couplings which are known and would serve the function of extending and retracting shaft 140 equally well. The use of a hydraulic motor 141 is preferred, since hydraulic motors are self-lubricating, may be designed to provide great torque, and will not normally be damaged if locked or frozen. Additionally, the use of a screw shaft in association with hydraulic motor will strongly inhibit or prevent motion of shaft 140 relative to casing 134, unless or until motor 141 is activated. This prevents shaft 140 from moving during towing. While not illustrated, additional or secondary apparatus may be provided to further lock shaft 140 into position relative to casing 134, such as various clamps and the like, to provide a secondary safety mechanism. However, secondary clamping is not essential to the operation of the preferred embodiment. In one contemplated alternative embodiment, shaft 140 may be provided at each end with small wedges or flares that engage with a restricted neck portion at one or both ends of casing 134. The interaction between the wedges and restricted neck portion will allow shaft 140 to be locked at the fully retracted position or fully extended position, due to the mechanical engagement between wedge and restricted neck, while also preventing shaft 140 from extending too far in either direction of travel.

Framework 130 is pivotally supported by axle tube 131, and the amount of rotation of axle tube 131 is controlled by suspension assembly 150. Assembly 150 is most preferably mounted securely at one or more places, such as through anchor bars 151, 152, to the structural framework of towing vehicle 210, such as into frame beams or the like. In the absence of strong structural supports, some type of sufficiently strong support structure will need to be provided for in towing vehicle 210, in order for primary assembly 100 to support large loads upon platform 110.

An air bag 180 having high capacity, the exact amount which will be readily determined by those of ordinary skill in the field, but which for example may be measured in tens or hundreds of thousands of pounds, is provided between a platform surface 161 and a framework formed by the combination of crossbar 172 and vertical struts 170, 171. This type of air bag is commonly used in semi-truck tractors and trailers and is used to form a part of the suspension system therein. In the preferred embodiment, a forty-thousand pound rating has been tested and determined to be adequate for the preferred application, but, as noted, other load capacities are contemplated herein. The exact configuration of air bag 180 is not consequential to the invention, and it is noteworthy here that air bag 180 may not even include air. In the strictest sense, air bag 180 will include a chamber within which a gaseous medium such as air or other highly compressible gas or fluid may be introduced. The chamber will then be expansible along at least one axis, responsive to the internal pressure of the chamber and the forces external to air bag 180.

Figure 2:
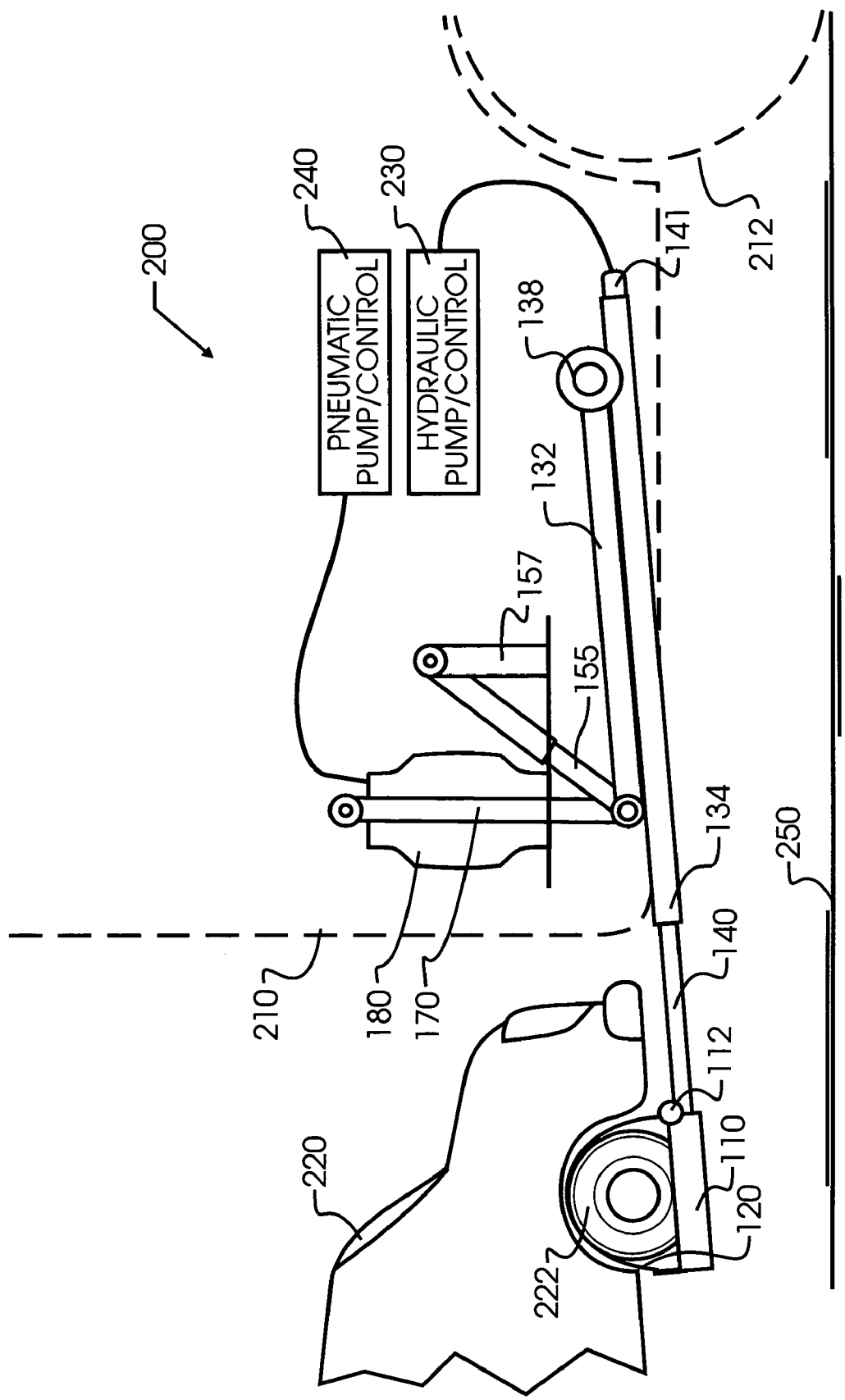
FIG. 2 illustrates the preferred embodiment vehicular towing apparatus from a side plan and schematic view in combination with towing and towed vehicles.

Most preferably, cover 181 of air bag 180 will be attached to or pressed securely against crossbar 172. Vertical struts 170, 171 pass through holes 153, 154 in platform surface 161, and are in turn anchored securely against suspension tube 135. In operation, air bag 180 may be inflated through air line 182 to increase the spacing between platform surface 161 and crossbar 172, which in turn raises suspension tube 135. This has the overall effect of raising platform 110. FIG. 2 illustrates framework 130 raised to a position approximately horizontal, or parallel to the ground. By releasing air from air bag 180 through air line 182, it is also possible to lower platform 110, most desirably down to ground level. The rating of air bag 180 should be great enough not only to accommodate any load upon platform 110, but also to provide adequate tolerance for momentary increases in load such as may occur when a bump or obstacle in roadway 250 is encountered.

Air bag 180 is most preferably used in combination with a pair of 90-10 shock absorbers 155, 156. Shock absorbers 155, 156 allow platform 110 to raise easily, but resist the lowering thereof. When used in combination with air bag 180, a towed or carried load such as platform 110 floats gently over roadway 250. Air bag 180 provides substantial cushioning, which, in combination with shock absorbers 155, 156, limits transmission of forces up and down on the back of towing vehicle 210 while simultaneously providing a gentler transit for towed cargo such as vehicle 220 or other cargo such as a fully suspended bicycle, motorcycle or cargo box.

In the prior art, particularly when towing vehicle 210 is carrying a heavy load, bumps in roadway 250 tend to alternately lift the front wheels of towing vehicle 210 off of roadway 250 and force the front wheels down against roadway 250. This inconsistent force upon the front wheels is damaging to the tires and potentially hazardous to the handling and driving of towing vehicle 210. Consequently, in the prior art, towing vehicle 210 had to have sufficient weight in front of the rear axle to act as a counterweight against the cargo load being towed or supported upon the hitch behind the rear axle, and the front axle had to be rated for loads much greater than the vehicle load alone.

This problem of increased and decreased forces upon the front axle of towing vehicle 210 is an even greater problem where the rear wheels 212 of towing vehicle 210 are moved forward from the back bumper, such as commonly found on many school buses and recreational vehicles, and as illustrated herein in FIG. 2. Torque is measured as a function of force multiplied by the distance from the pivot point, so, for a given force or load down upon the hitch, the torque is greater as the distance from the pivot point, which is the rear axle, increases. In these instances, in the prior art the load carrying capacity was much more adversely impacted where the hitch is spaced significantly from the rear axle. With the present air bag and shock absorber combination, this inconsistent loading of the front wheels is virtually eliminated. Furthermore, framework 130 serves to shift the load forward substantially, bringing the hitch force much closer to the rear axle.

A set of rollers 173, 174 assist vertical travel of air bag 180 while limiting rotation about an axis transverse to towing vehicle 210, by acting on vertical struts 170, 171. In effect, these help to keep air bag 180 upright while preventing interference between struts 170, 171 and platform surface 161. Shock absorber pivots 157-160 are provided for shock absorbers 155, 156. These provide a pivot point and physical anchor. While illustrated in the drawing as emanating from platform surface 161, these pivots 157-160 may be anchored separately from platform surface 161. The separate anchoring of shock absorbers 155, 156 reduces the stresses placed upon platform anchors such as anchor bars 151, 152. As aforementioned, a wide variety of anchoring points and attachment methods are contemplated for attaching the suspension assembly 150 to towing vehicle 210. In many cases, the exact structure will depend upon the physical construction of the towing vehicle and appropriate locations available for attachment and support.

As illustrated schematically by blocks in FIG. 2, the preferred embodiment towing apparatus 200 includes a hydraulic pump and control 230, which is used to activate hydraulic motor 141. In addition, a pneumatic pump and control 240 is also provided, which controls the pressure of air within air bag 180. As shown in FIG. 2, air bag 180 is inflated sufficiently to raise towed vehicle 220 from roadway 250. For travel along roadway 250, it will normally be desired to raise platform 110 sufficiently to provide adequate clearance above roadway 250, while still allowing air bag 180 and shock absorbers 155, 156 to support and cushion the load created by towed vehicle 220.

To load vehicle 220 for towing using preferred platform 110, a person will lower platform 110 to the ground by deflating air bag 180. This is done using switches, keypad or the like provided at pneumatic pump and control 240. Shock absorbers 155, 156 will offer some resistance to the motion, helping to assist with a gentle lowering of the platform. Once lowered to the ground, ramps 113 are extended from wheel cusps 111 to the position illustrated in FIG. 1. In this position, ramps 113 will more readily permit drive wheels 222 of vehicle 220 to be driven into cusps 111. Next, strap 120 is extended between ramp 113 and ratchet 112, and tightened securely by rotating ratchet 112. The pneumatic pump and control 240 is once again actuated, this time to increase pressure within air bag 180, thereby raising drive wheels 222 off of the ground. The preferred distance between towing vehicle 210 and towed vehicle 220 may be set or adjusted through hydraulic pump and control 230, extending extensible shaft 140 a preferred distance. This distance should be great enough to accommodate a desired degree of articulation between the two vehicles without contact therebetween during cornering and the like.

Two additional elevated stops 116, 117 may optionally be provided, as shown in FIG. 1 and discussed hereinabove. When extensible shaft 140 is retracted, these two stops 116, 117 will serve to lock platform 110 against pivoting by contacting the hitch framework 130 at suspension bar 135. As will be apparent, platform 110 may be retracted completely out of the way, and in this position still provides a standard hitch ball 118 in the usual position, to which a standard trailer may be connected. Since shaft 140 is extensible, platform 110 and ball 118 may be positioned at any desired distance from the back of towing vehicle 210. Furthermore, platform 110 may be replaced by other attachment devices. A ball receiver or ball, various carrying platforms designed for cargo, including specifically designed platforms that may be limited to a single piece of cargo or cargo type, and other such supports may be used in lieu of or in combination with illustrated platform 110. So, for example, if a bicycle carrier requiring only 18 inches between the load center and the back of vehicle 210 were required, extensible shaft 140 can be positioned to accommodate the carrier without adding any further than the 18 inches. For vehicle transport, a greater distance may be required, and may be varied depending upon the vehicle being towed. In the prior art, a ball was provided adjacent the back of the towing vehicle, and then a long arm pivoted about the ball. The trailing vehicle was rigidly attached to the long arm. As a result, when cornering, the trailing vehicle tended to travel inside of the towing vehicle, requiring additional space for cornering. In the present invention, the ball or rotational joint is provided at the end of the extensible shaft adjacent the towed vehicle. This forces the towed vehicle to trail much more directly behind the towing vehicle, simplifying cornering.

For front-wheel drive vehicle 220 illustrated in FIG. 2, front wheels 222 are elevated and vehicle 220 is ready to be towed. Preferred platform 110 may, however, be replaced with an inverted ball-receiver if desired, and rear-wheel drive vehicles may be directly connected to receiver hitches already present on the towed vehicle. In this instance, vehicle drive wheels 222 will need held off of the ground using chains or other restraints. Connection between vehicles 210, 220 is still greatly simplified over the prior art, and the performance of the articulating connection improved by the presence of air bag 180.

To simplify connection between vehicles even further, an electrical trailer harness may be provided directly from one vehicle to the other using standard connectors. For example, a front-wheel drive vehicle 220 can be retrofit with a standard trailering electrical connection at the front side, for example near or just under the front bumper. Towing vehicle 210 may be electrically coupled from a standard electrical trailer connector directly into the front-wheel drive vehicle 220 electrical jack, and additional lights may be unnecessary. This will be particularly advantageous for those applications such as with a recreational vehicle, where the same vehicle will be regularly towed.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

The invention claimed is:

1. An articulated vehicle having a front section with a source of motive power therein, a rear section having at least one wheel and a flexible joint between said front section and said rear section comprising:

a framework pivotal about a first axis relative to said first section and extending from said first axis to said flexible joint distal to said first axis, said flexible joint coupling said front section to said rear section; and a suspension assembly providing variable forces between said front section and said framework having an air bag, and a means for operatively adjusting the pressure within said air bag to pivot said framework about said first axis and thereby raise and lower said at least one wheel between a ground engaging position and a ground-disengaged transport position;

said suspension assembly further comprises at least one shock absorber operative to allow said framework to raise easily but resist the lowering thereof.

2. The articulated vehicle of claim 1 wherein said at least one shock absorber further comprises a 90-10 shock absorber.

* * * * *